United States Patent [19]

Hensch

[11] 4,143,219

[45] Mar. 6, 1979

[54] FLAME RETARDED POLYURETHANE FOAMS HAVING REDUCED DISCOLORATION

[75] Inventor: Edward J. Hensch, Park Ridge, N.J.

[73] Assignee: Stauffer Chemical Company, Westport, Conn.

[21] Appl. No.: 798,964

[22] Filed: May 20, 1977

[51] Int. Cl.² .......................... C08K 5/46; C08K 5/52
[52] U.S. Cl. ..................... 521/107; 252/8.1; 252/402; 260/45.7 P; 260/45.8 SN; 521/115; 521/121; 521/906
[58] Field of Search ............... 260/45.8 SN, 2.5 AJ, 260/2.5 BB; 521/107

[56] References Cited

U.S. PATENT DOCUMENTS

| | | | |
|---|---|---|---|
| 3,214,397 | 10/1965 | Cox | 260/2.5 BB |
| 3,429,837 | 2/1969 | Langrish et al. | 260/2.5 BB |
| 3,468,842 | 9/1969 | Mollica et al. | 260/45.8 SN |
| 3,567,664 | 3/1971 | Haring | 260/2.5 BB |
| 3,574,149 | 4/1971 | Harrington | 260/2.5 AJ |
| 3,637,542 | 1/1972 | Doerge et al. | 260/2.5 BB |
| 3,714,077 | 1/1973 | Cobbledick et al. | 260/2.5 BB |
| 3,793,240 | 2/1974 | Smith | 260/2.5 BB |
| 3,847,843 | 11/1974 | Dany et al. | 260/2.5 BB |
| 4,005,034 | 1/1977 | Weil | 260/45.7 P |
| 4,010,211 | 3/1977 | Preston et al. | 260/2.5 BB |
| 4,045,378 | 8/1977 | Maxwell | 260/2.5 AJ |

Primary Examiner—Donald E. Czaja
Assistant Examiner—R. A. White
Attorney, Agent, or Firm—Daniel S. Ortiz

[57] ABSTRACT

The discoloration of low density polyurethane foams produced with certain flame retardants is reduced by incorporating phenothiazine into the foam. The phenothiazine can be employed by admixing with the flame retardant from about 0.25 to about 5.0 percent phenothiazine by weight of the flame retardant.

10 Claims, No Drawings

FLAME RETARDED POLYURETHANE FOAMS HAVING REDUCED DISCOLORATION

BACKGROUND OF THE INVENTION

1. Field of the Invention

The present invention generally relates to flame retarded polyurethane foams, and particularly concerns flame retarded, low density polyurethane foams having improved color characteristics.

2. The Prior Art

When low density polyurethane foams are treated with flame retardants to reduce their flammability, certain physical properties of the foams are detrimentally affected. One of the frequent problems is scorching of the center of the foam buns which results in unacceptable color of the foam. This discoloration is reduced to an acceptable level pursuant to the present invention by incorporating phenothiazine into the foam.

It is known in the prior art to utilize phenothiazine to prevent propagation of free radical reactions that can cause scorch in polyurethane foams. Such reactions generally involve the ether moieties of the polyether employed in the foam formulation. Various compositions that are normally present in polyurethane foam formulations can catalyze these free radical reactions that cause the scorching. Among such compositions are tertiary amines which can be present in the formulation as catalysts for the reaction of isocyanate with water or with polyol, or as amine-started polyols or both, and various metallic compounds that can be present as impurities. These problems are described in U.S. Pat. No. 3,214,397.

The present invention is distinguished from the prior art in that the foams utilized according to the present invention do not become unacceptably scorched in the absence of the flame retardant. When the flame retardant is added to the foam formulation, however, unacceptable scorch results. It is a theory of the present invention that this scorching is the result of acidity produced by the flame retardant. The phenothiazine acts as an acid acceptor, thereby preventing the unacceptable scorching of the foam.

SUMMARY OF THE INVENTION

In accordance with the present invention, the color of low density urethane foams treated with flame retardants is improved by the addition of phenothiazine to the foam.

Many flame retardants cause color problems in low density urethane foams. The discoloration occurs when the foam becomes scorched during cure. This scorching is believed to be caused by acidity that is produced by the flame retardant. An acid scorching mechanism is especially likely in the cases where the foam does not scorch on curing in the absence of a flame retardant. By providing a phenothiazine acid acceptor in accordance with the present invention these scorch problems are overcome.

DETAILED DESCRIPTION OF THE INVENTION

The present invention is particularly concerned with low density polyurethane foams that do not become unacceptably scorched when cured in the absence of a flame retardant.

The present invention is also particularly concerned with poly (haloethyl-ethyleneoxy) phosphoric acid esters used as flame retardants in low density polyurethane foams. Such flame retardants are described, for example, in U.S. Pat. No. 3,896,187.

Flame retardant compositions comprised of mixtures of poly (haloethyl-ethyleneoxy) phosphoric acid esters and other flame retardants are also included in the scope of the present invention. Said other flame retardants include tris(haloalkyl) phosphates such as tris(dibromopropyl) phosphate, tris($\beta$-chloroethyl) phosphate and tris ($\beta$-chloropropyl) phosphate among others.

The flame retardants are employed in a flame retardant effective amount, generally from about 3 percent to about 20 percent by weight of the polyol in the foam formulation.

The phenothiazine utilized in accordance with the present invention can be admixed with the foam formulation by conventional techniques. For example, it can be added alone or in combination with other ingredients of the foam formulation. It can also be admixed with the flame retardant composition prior to admixture of the flame retardant with the foam formulation.

Phenothiazine employed in the foams of the present invention is generally provided in amounts from about 0.25 percent to about 5.0 percent by weight of the flame retardant composition. Accordingly, a flame retardant composition incorporating the phenothiazine therein can be conveniently prepared prior to incorporation into the foam formulation.

Numerous conventional foam formulations for low density polyurethane foams can be utilized in accordance with the present invention. The selection of ingredients and process conditions can easily be determined by those skilled in the art.

The color of the foams of the present invention can be evaluated by numerous recognized methods as set forth, for example, in *Principles of Color Technology*, Fred W. Billinger, Jr. and Max Saltzman (Wiley Interscience, 1966)

In the experimental work on the present invention, a Hunter colorimeter was utilized to measure color differences pursuant to the color-difference formula:

$$\Delta E \text{ (Hunter)} = (\Delta L^2 + \Delta a^2 + \Delta b^2)^{\frac{1}{2}}$$

Where:
$\Delta$ E (Hunter) = color difference
$\Delta$ L = lightness compared to standard
$\Delta$ a = redness, if positive, or greenness, if negative, compared to a standard
$\Delta$ b = yellowness, if positive, or blueness, if negative, compared to a standard All of the values for $\Delta$ L, $\Delta$ a and $\Delta$ b are calculated within the Hunter instrument by electrical means and read directly from its dials. The most commonly used standard of color comparison is a pure white sample. A white tile was used in the experimental work on the present invention.

The present invention will be more fully illustrated in the Examples which follow.

EXAMPLES

Six foam formulations were prepared. The basic foam formulation components for each one were as follows:

| | |
|---|---|
| 3500 Molecular weight polyether polyol | 100 grams |
| 80/20 Toluene diisocyanate (110 Index) | 61.1 grams |
| Water | 5.0 grams |
| Non-hydrolyzable silicone surfactant | 1.1 gram |
| Diazabicyclo octane catalyst (33% active) | 0.3 gram |
| N-Ethylmorpholine catalyst | 0.05 gram |

| -continued | |
|---|---|
| 50% Stannous octoate | 0.4 gram |

The six foam formulations were designated Foam A, Foam B, Foam C, Foam D, Foam E and Foam F. The Foam B formulations was admixed with a flame retardant and the foam formulations for foams C through F were admixed with the same flame retardant and various amounts of phenothiazine.

After mixing all of the foam ingredients, the materials for each foam were poured into a 12 × 12 × 5 inch cake box. When the foam buns completed their rises, thermocouples were inserted into the centers of the buns. When the thermocouples recorded 150° C., they were removed from the buns. The buns were then placed into a preheated microwave oven that had been calibrated so that 350 grams of water would increase in temperature by 50° C. when heated for 4 minutes. The buns were cured in the oven for four minutes, and then removed and allowed to cure at room temperature for an additional 30 minutes.

Following the cure of the buns, a one inch thick slice was cut perpendicular to the rise from the center of each bun. A 2 inch square sample was then removed from the center of each slice. A Hunter colormeter was then used to measure the values for calculating color difference.

The following table is a summary of this experimental work.

TABLE

| Foam | A | B | C | D | E | F |
|---|---|---|---|---|---|---|
| FR* (grams) | — | 8.0 | 8.0 | 8.0 | 8.0 | 8.0 |
| phenothiazine (grams) | — | — | 0.4 | 0.08 | 0.04 | 0.02 |
| ΔE (Hunter)** | 8.81 | 49.21 | 13.29 | 10.30 | 10.49 | 11.82 |

*2:1 blend of poly(chloroethyl-ethyleneoxy) phosphoric acid ester: tris (dichloropropyl) phosphate
**The standard was a piece of white tile having an E(Hunter) value of zero.

The color differences value in the foregoing table illustrate the substantial color improvement brought about by addition of phenothiazine to the flame retarded foam formulations.

Having set forth the general nature and some examples of the present invention, the scope is now particularly set forth in the appended claims.

What is claim is:

1. A flame retardant polyurethane foam comprising a low density polyurethane foam derived from a polyether polyol a flame retardant amount of a flame retardant comprised of a poly(haloethyl-ethyleneoxy) phosphoric acid ester and from about 0.25 percent to about 5.0 percent by weight of said flame retardant of phenothiazine wherein said low density polyurethane foam does not scorch on curing in the absence of a flame retardant.

2. The flame retardant polyurethane foam of claim 1 wherein the flame retardant is further comprised of a tris (haloalkyl) phosphate.

3. The flame retardant polyurethane foam of claim 2 wherein the weight ratio of poly (haloethyl-ethylenoxy) phosphoric acid ester to tris (haloalkyl) phosphate is about 2 to 1.

4. The flame retardant polyurethane foam of claim 2 wherein the amount of flame retardant is from about 3 percent to about 20 percent by weight of polyol present in the foam formulation.

5. The flame retardant polyurethane foam of claim 2 wherein the poly(haloethyl-ethyleneoxy) phosphoric acid ester is poly(chloroethyl-ethyleneoxy) phorphoric acid ester and the tris (haloalkyl) phosphate is tris (dichloropropyl) phosphate.

6. A composition for flame retarding low density polyurethane foams comprising a poly(haloethyl-ethyleneoxy) phosphoric acid ester and from about 0.25 percent to about 5.0 percent by weight of said ester of phenothiazine wherein said low density polyurethane foams do not scorch on curing in the absence of a flame retardant.

7. The composition of claim 6 further comprising a tris (haloalkyl) phosphate.

8. The composition of claim 7 wherein the weight ratio of poly (haloethyl-ethyleneoxy) phosphoric acid ester to tris (haloalkyl) phosphate is about 2 to 1.

9. The composition of claim 7 wherein the poly (haloethyl-ethyleneoxy) phosphoric acid ester is poly (chloroethyl-ethyleneoxy) phosphoric acid ester and the tris (haloalkyl) phosphate is tris (dichloropropyl) phosphate.

10. A method of preparing a flame retardant, low density polyurethane foam derived from a polyether polyol comprising admixing with a foam formulation a flame retardant comprised of a poly (haloethyl-ethyleneoxy)phosphoric acid ester and a tris (haloalkyl) phosphate and further admixing from about 0.25 percent to about 5.0 percent by weight of said flame retardant of phenothiazine followed by curing wherein said low density polyurethane foam does not scorch on curing in the absence of a flame retardant.

* * * * *